Feb. 9, 1954  L. LEE II  2,668,414
CONTROL APPARATUS FOR JET ENGINES
Filed Dec. 3, 1948  4 Sheets-Sheet 1

INVENTOR
Leighton Lee II.
BY
ATTORNEY

Patented Feb. 9, 1954

2,668,414

UNITED STATES PATENT OFFICE 2,668,414

CONTROL APPARATUS FOR JET ENGINES

Leighton Lee II, Rocky Hill, Conn., assignor to Niles-Bement-Pond Company, West Hartford, Conn., a corporation of New Jersey Application December 3, 1948, Serial No. 63,374

29 Claims. (Cl. 60—39.28)

1

This invention relates to fuel and speed control apparatus for internal combustion engines, and more particularly has reference to internal combustion engines suitable for propeller-propulsion, jet-propulsion, or propeller-and-jet propulsion of aircraft. Such engines usually include an air inlet, an air compressor, one or more combustion chambers, a gas turbine, and a tail pipe for discharging combustion gases to the atmosphere. Associated with the engine is a fuel system including a fuel pump for delivering fuel to the combustion chambers. This invention concerns apparatus to control the engine speed and power by controlling the fuel pump delivery as a function of manual control and several variables including engine speed, engine temperature, other engine operating conditions, as disclosed in my copending application for "Control Apparatus for Turbojet Engines," Serial No. 746,975, filed May 9, 1947, and this invention constitutes an improvement on the invention therein disclosed. This application is accordingly a continuation in part of my earlier application cited.

Objects of my invention are:

(1) To provide an improved fuel and speed control apparatus of the type disclosed in my parent application cited, wherein the droop of the speed control system is greatly reduced and the control may be made substantially isochronous.

(2) To provide an improved fuel and speed control apparatus of the type disclosed in my parent application cited, wherein better operating results are obtained with a greatly simplified speed control mechanism.

(3) To provide improved fuel and speed control apparatus for an internal combustion engine employing the same principles and means disclosed in my parent application cited, except as to the speed control system which herein makes the speed governor cut-in vary the control oil pressure by varying the pressure in the compressor discharge bellows, and thereby substantially reduces the droop of the speed control system.

(4) To provide in such apparatus improved mechanism for operating the barometric control system by the compressor discharge pressure.

Other objects and advantages of my invention will become apparent from a consideration of the appended specification, claims, and drawings, in which:

In the drawings and specification, the same reference numerals as appear in my parent application cited, are used to denote those elements of my invention herein which are identical with the invention disclosed in said parent application.

Figure 1

Figure 1:
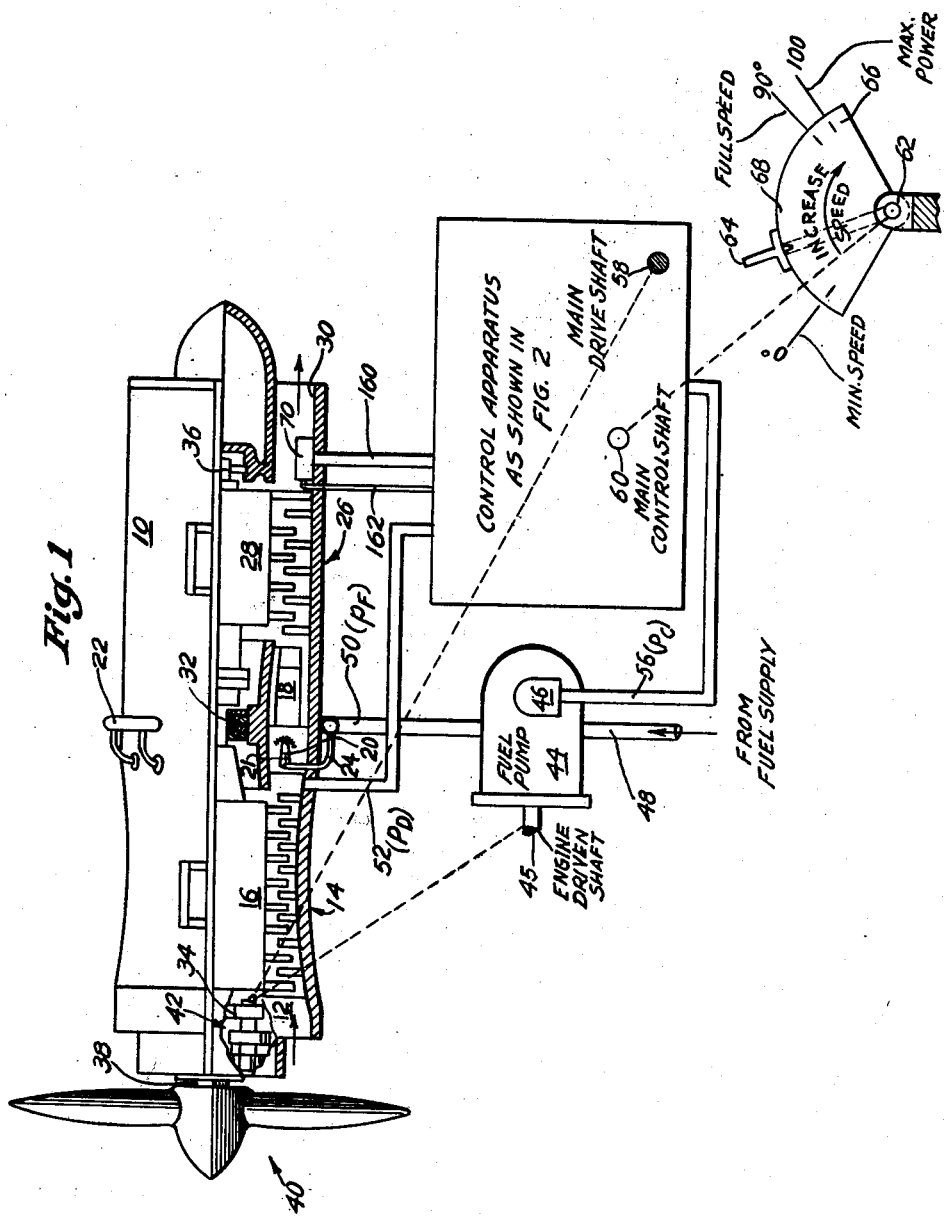
Figure 1 shows, somewhat diagrammatically, an engine suitable for propeller-and-jet propulsion of aircraft, together with its associated fuel pump and an engine control lever, there being also shown principal connections between the engine and a diagrammatic illustration of the fuel and speed control apparatus of Fig. 2.

Referring to the drawing, Fig. 1, there are shown the principal elements of the engine above referred to, a supporting casing 10, an air inlet 12, a multi-stage compressor 14, a compressor rotor shaft 16, one each of a number of combustion chambers 18, one of a corresponding number of fuel discharge nozzles 20 connected to a generally circular manifold 22 by means of a conduit 24, a multi-stage turbine 26, a turbine rotor shaft 28 connected to the compressor rotor shaft 16, a tail pipe 30 for discharging combustion gases from turbine 26, a center bearing 32 and end bearings 34 and 36 supported by casing 10, a propeller shaft 38 to which is fixed a propeller 40, and a gear train 42 connecting shafts 16 and 38 for rotating propeller 40 at a speed proportional to engine speed and for operating the fuel pump and other accessories. Construction of a jet engine used solely for jet propulsion is similar to that of the engine of Figure 1 except for omission of the propeller and propeller shaft and corresponding modification of the gear train. Since, in a jet engine, the power developed by the turbine is used only for operating the compressor and accessories, single-stage rather than multi-stage turbine construction is generally employed.

A fuel pump 44 has associated therewith delivery varying means diagrammatically shown at 46. Pump 44 is connected to a pump inlet conduit 48 and to a pump discharge conduit 50. Fuel flows from the indicated source of supply through inlet conduit 48, pump 44, and pump discharge conduit 50 to manifold 22 in the engine. Pump 44 is operated by a drive shaft 45 connected to gear train 42 in the engine, or any other suitable source of power. The delivery varying means is responsive to a variable control oil pressure ($p_c$) in a conduit 56 which is regulated by the control apparatus of Fig. 2.

In each of the discharge nozzles 20 there is a series of fixed slots, one of which is indicated at 21, through which fuel enters the nozzles from conduits 24. The fuel flow from the nozzles is directly proportional to the effective area of slots 21 and is a square root function of the drop across the slots between the pressure in conduits 24, which is substantially equal to the pressure ($p_F$) in conduit 50, and the pressure in the combustion chamber. It follows, therefore, that the fuel pump delivery is a function of the pressure ($p_F$) in conduit 50 which is controlled by the delivery varying means 46.

When it is desired to limit the range of fuel pressure so that its value at maximum fuel flow is less than that corresponding to the square root function of the drop across slots 21, the nozzles may be provided with auxiliary slots supplied by another manifold connected to conduit 50 through a pressure-responsive flow-divider which opens at a predetermined value of the pressure ($p_F$). In this manner the pressure ($p_F$) may be maintained sufficiently high to produce satisfactory nozzle discharge without requiring the pump to operate under unfavorable pressure conditions at maximum flow.

Figure 2:
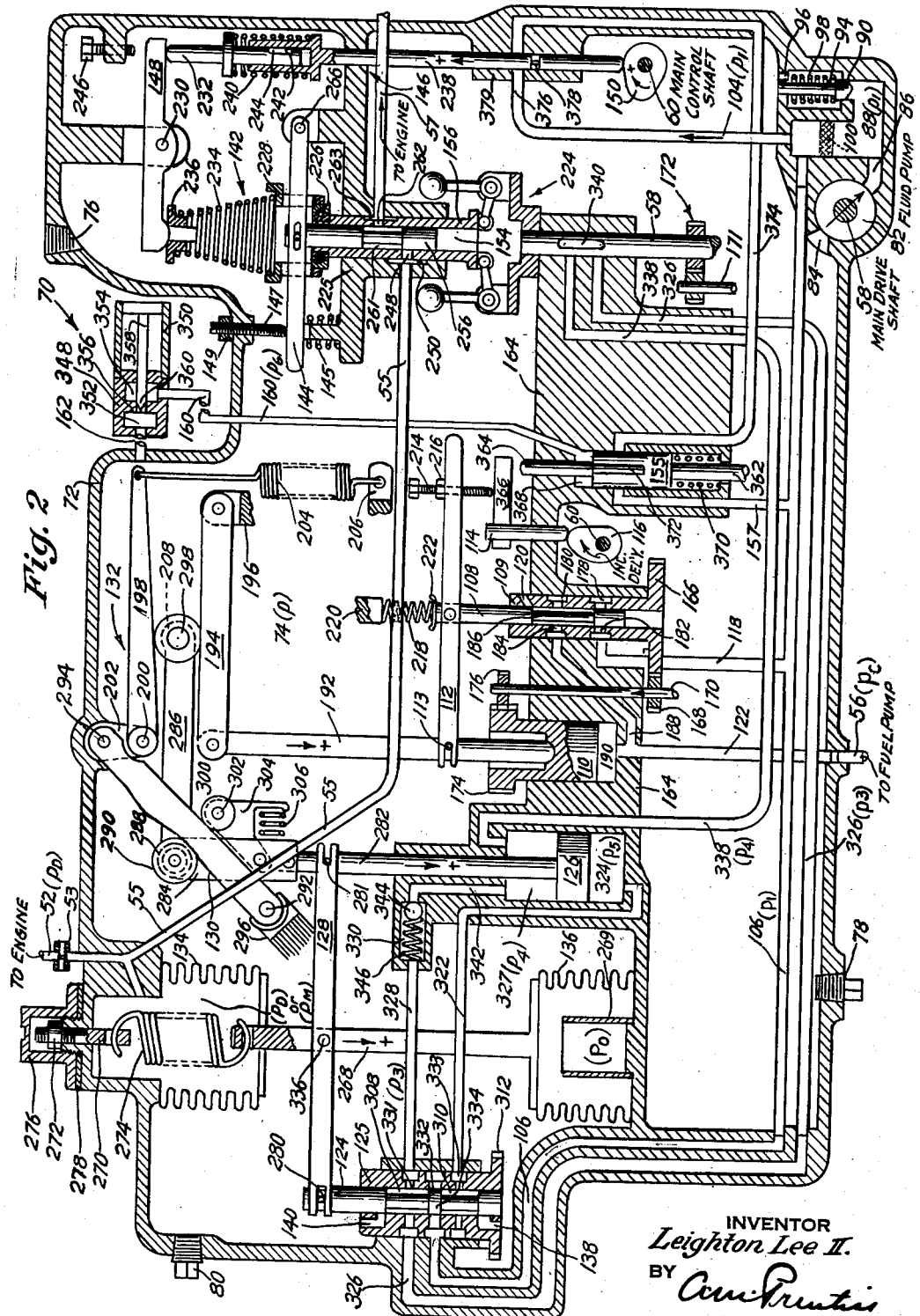
Figure 2 shows, also somewhat diagrammatically, fuel and speed control apparatus embodying the principles of my invention.

The control apparatus of Fig. 2, diagrammatically shown in Fig. 1, is connected to a source of compressor discharge pressure ($p_D$) in the engine by a conduit 52 and, as subsequently explained, the control apparatus is responsive to the pressure ($p_D$), which is an indication of air flow through the engine. The value of the pressure ($p_D$) increases as the engine speed increases, as flight speed increases, and the altitude of flight or entering air temperature decreases, and is also a function of the compressor characteristics.

A main drive shaft 58 in the control apparatus is driven by the engine at a speed proportional to engine speed and a main control shaft 60 is rotatable in response to movement of a shaft 62 to which is fixed an engine control lever 64. Control lever 64 is manually operable in reference to a scale 68 on a fixed quadrant 66, scale 68 being calibrated in terms of R. P. M. engine speed.

Figure 2

Referring to Fig. 2, there is shown, somewhat diagrammatically, an embodiment of my invention all principal elements of which, except a thermal control 70, are enclosed in a casing 72 having external connections with conduit 52 for supplying air to the apparatus at the compressor discharge pressure ($p_D$), and with conduit 56 for transmission of the variable control oil pressure ($p_c$) from the apparatus to the fuel pump delivery varying means 46 shown in Fig. 1. Casing 72 as shown in the drawing is of continuous cross-section but for purposes of manufacture and assembly may be made in an equivalent form comprising two or more separable elements.

The control apparatus of Fig. 2 is a self-contained hydraulic system employing the interior of casing 72 as a reservoir 74 which is maintained approximately full of suitable hydraulic fluid at the pressure ($p$) in order to permit the working elements to operate in an oil bath and which is vented at a threaded port 76 to the atmosphere or other desired pressure source. If desired, reservoir 74 may be made a part of the oil system of the engine. In this case, a pair of plugs 78 and 80 otherwise serving as drain plugs are removed from casing 72 and the respective casing openings are then connected by suitable inlet and outlet conduits to the engine oil system. The main drive shaft 58 operates an hydraulic pump 82 which pumps fluid from reservoir 74 through an inlet port 84 and an outlet 86 into a chamber 88. The pressure ($p_1$) in chamber 88 is maintained at a substantially constant value, approximately 240 p. s. i. in the embodiment shown, by a relief valve 90, which allows fluid to flow from chamber 88 past valve 90, through a chamber 94 and an aperture 96 to reservoir 74 in opposition to a substantially constant force produced by a valve spring 98. Fluid from chamber 88 enters two main fluid conduits 104 and 106 downstream from a filter 100, and is conveyed at pressure ($p_1$) to elements of the apparatus hereinafter specified.

The control apparatus comprises four mechanically and hydraulically cooperative component systems, as briefly outlined in the immediately following numbered paragraphs, for regulating the variable control oil pressure ($p_c$), namely:

(1) A manual control system principally including a main servo valve 108, a main servo valve sleeve 109, a main power piston 110, a main floating lever 112, a push rod 114, and a cam 116 fixed to the main control shaft 60, for rendering pressure ($p_c$) variable by movement of the engine control lever 64, Fig. 1. Also included in the manual control system, as set forth herein, is a lever mechanism 132 comprising a pair of levers 194 and 198, a circular bearing 208 between said levers, a spring 204, and a rod 192 for loading piston 110 with a force due to spring 204. Fluid flows discontinuously to the manual control system through a conduit 118 connected to main fluid conduit 106 and is drained from the manual control system through an outlet passage 120 opening into reservoir 74 at the upper end of valve sleeve 109. The variable control oil pressure ($p_c$) is transmitted from the manual control system through a conduit 122 which is connected to conduit 56.

(2) A barometric control system principally including a barometric servo valve 124, a barometric servo valve sleeve 125, a barometric power piston 126, a barometric floating lever 128, a fixed elongated barometric cam 130, a positioning bar 286 for varying the position of bearing 208, and a pair of bellows 134 and 136, the former connected to conduit 52 and the latter evacuated to zero pressure $p_0$ and sealed. The pressure ($p_c$) is made a function of the compressor absolute discharge pressure ($p_D$ or $p_M$) by transmission of movement of piston 126 through cam 130, positioning bar 286, and lever mechanism 132 to the main power piston 110 in the manual control system. Fluid flows discontinuously to the barometric control system through the main fluid conduit 106 and is drained from the barometric control system through one or the other of two outlet passages 138 and 140 in sleeve 125, which passages open into reservoir 74.

(3) A speed control system principally including a governor valve mechanism generally indicated at 142, a governor lever 144, which is secured in an adjustable position by a spring 145 and a screw 147 locked by a lock nut 149. In this system, the pressure ($p_c$) is made a function of the engine speed by modifying the compressor absolute discharge pressure ($p_D$) in response to movement of an over-speed servo valve 156. Compressed air under a pressure ($p_M$), which is the compressor absolute discharge pressure ($p_D$) modified by a restriction 53, flows through a conduit 55 to the governor valve mechanism 142 and is discharged to atmosphere from that valve mechanism through a conduit 57 connected to a governor valve sleeve 156 therein.

(4) A thermal control system including the thermal control 70 and a thermal piston 155 for overriding the manual control system as a function of the engine temperature. Normally, there is no flow of fluid through the thermal control system, but when the predetermined limiting or maximum allowable temperature is exceeded fluid flows from main fluid conduit 106, successively through a conduit 157, past piston 155, and through a conduit 160, thermal control 70, and a conduit 162 to reservoir 74.

*Manual control system*

A wall 164 is provided in reservoir 74 and is suitably bored or otherwise machined for housing and operating therein some elements of each of the four component control systems previously defined.

In the manual control system, a gear 166 is provided at the lower end of main servo valve sleeve 109 for rotation of the sleeve in wall 164, sleeve 109 having its upper end extending somewhat beyond the upper side of the wall. Gear 166 and sleeve 109 are rotated by another gear 168 fixed to a shaft 170 which in turn is driven from the main drive shaft 58 through a suitable connection (not shown). Similarly, a gear 174 is provided at the upper end of piston 110 which is both slidably and rotatably operable in wall 164 and is installed with gear 174 above the wall. Gear 174 is rotated by another gear 176 fixed to the upper end of shaft 170. Any other means of suitably rotating sleeve 109 and piston 110 may be employed, the purpose of such rotation being to avoid sticking of the main servo valve 108 in sleeve 109 and to prevent sticking of the piston in wall 164.

Valve sleeve 109 is provided with a pair of parallel circumferential grooves 178 and 180 and one or more corresponding ports 182 and 184 drilled radially at the horizontal centers of the grooves. The upper end of conduit 118 opens opposite groove 178 and ports 182 are therefore continuously supplied with fluid at pressure ($p_1$). Groove 180 is similarly connected to the upper end of a passage 188 which is connected to conduit 122.

Valve 108 is undercut to form an annular chamber 186 and has a neutral position as shown in Fig. 2 in which the lower edge of the undercut is alined with the upper edge of port 182, and the upper edge of the undercut is alined with the lower edge of outlet passage 120. Ports 184 communicate with chamber 186 regardless of the position of valve 108 in its normal range of operation. When valve 108 is displaced downward so that port 182 opens into chamber 186, a path for flow is provided which successively includes conduit 118, groove 178, ports 182, chamber 186, ports 184, groove 180, passage 188, and conduit 122, at the upper end of which there is an expansible chamber 190 included between the lower end of piston 110 and wall 164. The value of the variable control oil pressure ($p_c$) in conduit 56 and chamber 190 is thus increased upon downward movement of valve 108 from its neutral position. Similarly, when valve 108 is displaced upward so that chamber 186 opens into outlet passage 120, a path for flow is provided from conduit 56 and chamber 190, through passage 188, groove 180, ports 184, chamber 186, and outlet passage 120 to reservoir 74, the pressure ($p_c$) being thereby decreased.

The left-hand end of main floating lever 112 has a pin-and-slot connection 113 with rod 192 which has a self-alining connection at its lower end with the bored interior of piston 110 so that vertical movement of the piston produces upward movement of rod 192 and simultaneously allows angular displacement of the rod with respect to the piston without causing the latter to bind in wall 164. The upper end of rod 192 is hinged to the left-hand end of lever 194 in mechanism 132, lever 194 having its right-hand end hinged to a fixed support 196. Above lever 194, mechanism 132 includes the lever 198 which has its left-hand end hinged at a pin 200 fixed in a support 202 above and approximately on the centerline of piston 110. The right-hand end of lever 198 is connected to tension spring 204 which has its lower end anchored in a fixed support 206. A measure of the downward force of spring 204 is transmitted from lever 198 to lever 194 through the circular bearing 208 the position of which is regarded as fixed in the present discussion. Piston 110 is subjected to an upward force proportional to the differential ($p_c - p$) between the respective pressures in chamber 190 and reservoir 74 and to a measure of the downward force of spring 204 which is transmitted to the piston through lever mechanism 132 and rod 192. The rate of spring 204 is high, so that the value of the differential ($p_c - p$) and hence the variable control oil pressure ($p_c$) may vary throughout a wide range of values corresponding to a relatively narrow range of movement of the piston which is positioned by the resultant of the forces acting thereon.

The right-hand end of main floating lever 112 engages an arm 366 pinned to a rod 114 which contacts the upper face of a cam 116 fixed to main control shaft 69, hence the lever 112 is positioned by: (1) push rod 114 and arm 366 which engages an adjusting screw 214 threaded into lever 112 and locked in place by means of a nut 216; (2) rod 192 which serves as a pivotal support for the left-hand end of lever 112; and (3) a light spring 218 compressed between a fixed support 220 and a retainer 222 supported by the upper end of valve 108, which causes the lever 112 to follow movement of push rod 114 as the latter is actuated by cam 116. It is to be noted from the above that, except for the substantially negligible force due to spring 218, the main servo valve 108 does not directly affect the position of lever 112 but instead is positioned by that lever, there being equal and opposite forces proportional to pressure ($p$) on the ends of valve 108. When considering the manual control system only, the position of bearing 208 and hence the downward force of rod 192 corresponding to any given position of piston 110 is regarded as fixed. In the neutral position of servo valve 108, as shown, the manual control system is in a state of equilibrium; i. e., there is no flow of fluid in the system, the pressure ($p_c$) is such as to maintain piston 110 in a position corresponding to the position of cam 116 and the neutral position of valve 108, and the pump delivery corresponds with the value of pressure ($p_c$) trapped in the system by closure of the servo valve.

Upon clockwise movement of control lever 64, Fig. 1, and consequent clockwise movement of main control shaft 60 and cam 116, lever 112 moves clockwise about connection 113 and servo valve 109 is depressed from its neutral position. Consequently, as previously explained, the value of pressure ($p_c$) and hence the fuel flow to the engine increase. Pressure ($p_c$) continues to increase until piston 110 responds by raising lever 112 and valve 108 a sufficient amount to restore the valve to its neutral position, following which no further change occurs as long as the position of shaft 60 remains undisturbed. Similarly, upon counterclockwise movement of control lever 64, Fig. 1, and corresponding counterclockwise movement of shaft 60 and cam 116, lever 112 moves counterclockwise about its connection with rod 192 and the servo valve is elevated above its neutral position. In this case, as previously explained, the value of pressure ($p_c$) and hence the fuel flow decrease, continuing to do so until piston 110 responds by lowering rod 192 and lever 112 to a new position at which servo valve 108 is again restored to its neutral position. When servo valve 108 is in its neutral position, the value of pressure ($p_c$) and hence the fuel flow is determined by the position of control shaft 60 for a given fixed position of bearing 208 in lever mechanism 132.

As stated earlier, the engine speed corresponding to any given value of fuel flow varies as a function of entering air density, flight speed, and other factors over which the manual control system has no control and to which it is unresponsive. It follows, therefore, that the manual control system provides a means of regulating the variable control oil pressure ($p_c$) from minimum to maximum values corresponding to a predetermined range of clockwise movement of the engine control lever 64, Fig. 1, and depending upon the downward force transmitted by rod 192 to piston 110.

*Speed control system*

Governor valve mechanism 142 includes a flyball speed responsive device 224 operated by the main drive shaft 58 for varying the vertical position of governor valve sleeve 156 as a function of engine speed. The valve sleeve operates in a suitably bored projection 225 of casing 72. The inner race of a ball bearing assembly 226 is fastened to the upper end of sleeve 156 and the outer race of bearing assembly 226 supports a lower governor spring retainer 228 which is slotted so that lever 144 and retainer 228 are independently movable in relation to each other in a vertical plane. Setting lever 148 is pivoted approximately at the center of its length on a fixed pin 230 and has its right-hand end supported by a follower push rod 232 in governor push rod assembly 146. A governor spring 234 is compressed between lower retainer 228 and an upper governor spring retainer 236 which is forced upward by spring 234 against the left-hand end of setting lever 148. Bearing assembly 226 permits sleeve 156 to rotate while retainer 228 remains stationary and hence prevents torsional stress in spring 234.

Push rod assembly 146 is actuated by cam 150 in response to rotation of shaft 60 by the engine control lever 64 (Fig. 1), for varying the position of setting lever 148 and the upper governor spring retainer 236, and hence for varying the load of spring 234 on valve sleeve 156 in opposition to the upward force of the speed responsive device 224. Assembly 146 includes the follower push rod 232 having its lower end slidably operable in a hollow sleeve formed on the upper end of a push rod 238 engaging cam 150. During a predetermined range of movement of control lever 64 in which the engine speed is manually variable, a spring 240 maintains the overall length of the assembly 146 at a value determined by engagement of a pin 242 in push rod 238 with the lower end of a slot 244 in follower push rod 232. When, however, setting lever 148 engages an adjusting screw 246 so that further upward movement of rod 232 is prevented, upward movement of push rod 238 is permitted by compression of spring 240, the length of slot 244 and the distance between the lower end of rod 232 and the corresponding portion of rod 238 being sufficient to prevent jamming of the push rod assembly.

In the particular embodiment shown, the downward force of governor spring 234 varies substantially directly with the spring deflection, while the upward force due to speed responsive device 224 is proportional to the square of the engine speed. When these forces are in equilibrium, there is no vertical movement of sleeve 156. The position of the sleeve corresponding to a condition of equilibrium may vary over a predetermined range in which a port 248 in sleeve 156 opens into an annular recess 250 in projection 225. Cam 150 is generated so that as control lever 64 is advanced clockwise throughout a predetermined range in reference to the uniformly calibrated R. P. M. scale 68 (Fig. 1), the deflection of spring 234 is varied at a non-uniform rate so that the speed required to produce a state of equilibruim increases according to the scale value corresponding to the position of the lever.

Recess 250 adjacent sleeve 156 is connected by conduit 55 to the interior of bellows 134 and the pressure ($p_M$) in bellows 134 is controlled by governor valve sleeve 156 which cooperates with a governor valve 256. Valve 256 has a pin-and-slot connection with governor lever 144 and is slidably operable inside sleeve 156 only in response to the adjustment of lever 144 by adjustment screw 147. The governor valve 256 is undercut to provide an annular chamber 261 which is connected through a port 262 and annular groove 263 in sleeve 156 with the inner end of discharge conduit 57 in all positions of sleeve 156 within its working range. The land at the lower end of valve 256 extends well below port 248 so that when valve sleeve 156 moves below the cut-off position shown in Fig. 2, port 248 is always covered. The right-hand end of governor lever 144 is hinged on a pin 266 in projection 225 and its left-hand end is held by spring 145 against the lower end of adjustment screw 147. The position of valve 256, as set by adjustment screw 147, determines the point in the upward travel of valve sleeve 156 at which port 248 commences to be uncovered and flow of air through conduit 55 begins.

The position of governor valve sleeve 156 is in accordance with the balance between the downward force of spring 234 and the upward thrust of speed responsive device 224. When these two forces are in equilibrium, valve sleeve 156 is stationary and the amount of opening of port 248 and hence the flow of air through conduit 55 is determined by the position of the upper edge of port 248 with respect to the upper edge of valve 256. As long as port 248 is covered by valve 256, there is no flow of air through conduit 55 and hence the pressure $p_M$ in bellows 134 is equal to the compressor absolute discharge pressure $p_D$, and if other factors affecting engine operation are constant, a state of steady operation is maintained. If now the engine speeds up, owing say to a reduction of the load thereon, speed responsive device 224 will overcome the force of spring 234 and push up valve sleeve 156 until the increased force of spring 234 again balances the new force of device 224. If the upward travel of sleeve 156 is sufficient to uncover a part of port 248, air will commence to flow through conduit 55 and reduce the pressure $p_M$ in bellows 134 below the compressor absolute discharge pressure $p_D$ in conduit 52 owing to the effect of restriction 53. This reduction in pressure $p_M$ in bellows 134 causes a reduction in the variable control oil pressure $p_c$ and hence the flow of fuel to the engine, with consequent slowing down of engine speed, as hereinafter described, until the original speed is restored.

The position of lever 144, as set by adjusting screw 147, determines the amount of opening of port 248 for any given movement of sleeve 156, hence the setting of lever 144 may be used to limit the maximum opening of port 248 which in turn determines the maximum flow of air through conduit 55, the minimum pressure $p_M$ in bellows 134, and the minimum variable control oil pressure $p_c$. The adjustment of the position of lever 144, by screw 147, may therefore be used to establish a minimum value of the variable control oil pressure $p_c$ in order to avoid burner "blowout" and consequent engine stoppage.

*Coordination of the manual and speed control systems*

Both cam 116 in the manual control system and cam 150 in the speed control system are fixed to control shaft 60 for simultaneous clockwise operation as control lever 64, Fig. 1, is advanced clockwise through the predetermined range. In the embodiment shown, the total range of movement of lever 64 is approximately 100°.

In a condition of steady state operation at constant speed and constant fuel flow, the positions of all movable elements in both the manual and the speed control systems are fixed except in respect to rotation, main servo valve 108 and governor valve sleeve 156 are in their neutral positions, pressure ($p_c$) is substantially constant, and as subsequently explained and as shown in Fig. 2, main floating lever 112 is supported by arm 366 and rod 114.

When control lever 64 is advanced clockwise from the position shown in Fig. 1 to another position within the first 90° range of movement of the lever, the lift of cam 116 decreases and push rod 114 is lowered, allowing main floating lever 112 to turn clockwise, thereby moving main servo valve 108 below its neutral position. Simultaneously with movement of cam 116, however, cam 150 also turns clockwise to elevate push rod assembly 146 and to thereby turn setting lever 148 counterclockwise on pin 230. The downward force of governor spring 234 is thus increased and governor valve sleeve 156 is depressed from its neutral position in respect to valve 256. Since valve 256 covers port 248 for all positions of sleeve 156 below its neutral position, as shown in Fig. 2, no air can flow from conduit 55 through recess 260, port 248, annular chamber 261, port 262, annular groove 263 and conduit 57 to the outside atmosphere. Hence, the pressure ($p_M$) in bellows 134 remains unaffected and continues to equal pressure $p_D$.

The amount of clockwise movement of lever 112 about connection 113 is limited always by push rod 114. Hence, the manually operated cam 116 determines the position of the right end of lever 112, since the speed control system is at this time ineffective. The fuel flow to the engine corresponding to a given position of the engine control lever is thereby rendered maximum during acceleration of the engine. The maximum fuel flow during periods of acceleration is determined by the control lever setting acting through cam 116, and not by the difference between actual speed and desired speed. This limitation of the fuel flow during acceleration is necessary to prevent overheating of the engine. As long as the increased speed of the engine is below the maximum speed corresponding to the setting of lever 144 by adjusting screw 147, port 248 remains covered by valve 256 and the overspeed mechanism 142 remains ineffective.

However, if the engine speed continues to increase until it approaches the value corresponding to the position of lever 144 and valve 256, governor valve sleeve 156 rises to a point where it begins to uncover port 248, whereupon air commences to flow through conduit 55 and reduce the pressure ($p_M$) in bellows 134 below the pressure ($p_D$). This causes the variable control pressure ($p_c$), and hence fuel flow to the engine, to be decreased as described above, with resulting decrease in engine speed, until said speed is restored to the value determined by the setting of lever 144 by adjusting screw 147.

When control lever 64 is retarded in a counterclockwise direction from one position to another in the 0°–90° range of lever movement, reversal of the above process takes place. Simultaneously with upward movement of rod 114, push rod assembly 146 is lowered so that setting of lever 148 reduces the deflection and load of governor spring 234 and governor valve sleeve 156 is pushed up by the thrust of speed responsive device 224 until the downward force of the spring 234 again balances the upward thrust of device 224. As long as the upward movement of valve sleeve 256 is insufficient to uncover any part of port 248, the overspeed mechanism 142 remains ineffective. If, however, the rise of sleeve 256 is sufficient to uncover a part of port 248, air will commence to flow through conduit 55 and reduce the pressure ($p_M$) in bellows 134 below the pressure ($p_D$). This causes the variable oil control pressure ($p_c$) and fuel flow to the engine to decrease until the engine speed is reduced to the value determined by the setting of lever 144 by adjusting screw 147.

Concurrent with the lowering of push rod assembly 146 by cam 150, push rod 114 is raised by cam 116. This causes counterclockwise rotation of floating lever 112 which raises main power servo valve 108, with consequent reduction of variable control oil pressure ($p_c$) and engine speed to correspond with the new position of control lever 64.

As control lever 64 is moved between its 90° and 100° quadrant positions, the lift of cam 150 remains substantially constant at a maximum value. The engine speed therefore has a substantially constant maximum value when the lever is in its 90°–100° range of travel. Within this range, however, the lift of cam 116 continues to increase to a maximum value corresponding to the extreme or 100° position of lever 64. Response of the combined manual and speed control systems to movement of the control lever in this ten-degree range is similar to that in cases previously explained in which the fuel flow and engine speed vary as a function of both the manual and speed control systems, except that the speed control system is effective to override the manual control system to a relatively greater extent in order to maintain a substantially constant maximum value of speed. As the fuel flow is increased at constant maximum engine speed, the engine torque and hence the brake-horsepower increase, the maximum brake-horsepower being developed at the 100° lever position. The adjusting screw 246 may be set to cause actuation of spring 240, if desired, at any position of cam 150, and to thereby establish the maximum speed at a lower value than is otherwise obtainable as a function of the lift of the cam. Alternatively, if desired, the lift of cam 150 may be allowed to increase throughout the 100° range of lever movement.

*Barometric control system*

The operation of lever mechanism 132 and positioning bar 286 and their relation to rod 192 is explained in the following description of the barometric control system and in subsequent explanations of coordinated functions of the barometric and other component systems.

In the barometric control system, the upper end of bellows 134 is fixed inside casing 72 directly over bellows 136 which is of substantially the same effective area and which has its lower end fixed to a portion of wall 164. A bar 268 rigidly connects the free ends of the bellows to each other so that expansion or contraction of either is accompanied by an equal and opposite movement of the other. A cylindrical stop 269 is provided to limit contraction of bellows 136. Inside bellows 134 and at its upper end there is an adjustable spring support 270 the position of which can be varied as desired by means of a nut 272. Between the lower end of support 270 and the upper end of bar 268 there is a tension spring 274 for biasing the bellows and bar assembly upward in opposition to the differential $(p_M-p_0)$. A cover 276 and a gasket 278 are provided for enclosing support 270 and nut 272 which, upon removal of cover 276, are accessible from the exterior of the casing. The barometric lever 128 is hinged at approximately the mid-position of its length on a pin 336 in bar 268, the left end of the lever being connected to the upper end of barometric valve 124 by means of a pin-and-slot connection 280 which permits vertical movement of valve 124 in sleeve 125 as the angular position of lever 128 changes. The right-hand end of lever 128 has a pin-and-slot connection 281 with a rod 282 fixed to the barometric power piston 126. The upper end of rod 282 above its connection with lever 128 is hinged to a link 284 which is pivotally connected to the left end of positioning bar 286 by means of a pin 288 on which turns a roller 290 engaged with the fixed barometric cam 130. The position of cam 130 is fixed by a pair of pins 292 and 294 respectively fitted into fixed supports 296 and 292. The cam is slidable on the pins so that it can be removed from the apparatus for replacement or any other desired purpose. The right-hand end of positioning bar 286 has a pin 298 fixed therein on which the circular bearing 208 is mounted. Roller 290 is held in contact with the upper surface of cam 130 by means of another roller 300 which is rotatable on a pin 302 fixed in a triangular bracket 304. Bracket 304 is pivoted to link 284 and a spring 306, compressed between the link and one side of the bracket, holds roller 300 against the lower side of cam 130. Thus, as rod 282 moves in a vertical direction, link 284 follows so that roller 290 remains in engagement with the contoured upper face of cam 130. Both vertical and angular movement are imparted to link 284 in this process so that: when piston 126 and rod 282 descend, bearing 208 is moved leftward and the downward force on main power piston 110 due to spring 294 is increased; and, similarly, when piston 126 and rod 282 rise, bearing 208 is moved rightward and the downward force on the main power piston 110 is decreased.

The barometric servo valve 124 is undercut to provide a pair of annular chambers 308 and 310 between the valve and sleeve 125 in which the valve is slidable. The vertical position of valve sleeve 125 in reference to casing 72 is fixed and the sleeve is rotated by means of a gear 312 driven from shaft 171 through a suitable connection (not shown). The valve sleeve has three pairs of ports 331, 332, and 333.

In all operating positions of valve 124, ports 331 open into the annular chamber 308 and ports 333 open into the annular chamber 310. Fluid in chambers 308 and 310 is maintained at pressures designated $(p_3)$ and $(p_4)$, respectively, as later explained.

Ports 332 are just closed when valve 124 is in its neutral position, as shown in the drawing, the width of the ports being substantially equal to the width of the valve land 334 between the lower end of chamber 308 and the upper end of chamber 310. The outlet passage 138 in sleeve 125 is also just closed by the land at the lower end of the valve and outlet passage 140 is similarly just closed by the land at the upper end of the valve, when the latter is in its neutral position.

Ports 332 are connected to the end of conduit 106 so that the ports 332 are continuously supplied with fluid at pressure $(p_1)$. Ports 333 are connected to one end of a conduit 322 which has its other end connected to an expansible chamber 324 below piston 126. Ports 331 are connected to a pair of conduits 326 and 328. Conduit 328 is connected to a check valve chamber 330 in wall 164 above the barometric power piston 126, for transmitting the pressure $(p_3)$ to chamber 330 from chamber 308. Conduit 326 is supplied with fluid from chamber 308 at pressure $(p_3)$ and is intermittently connected by means of a slot 340 on main drive shaft 58 to a conduit 338 for supplying fluid at a pressure $(p_4)$ to a chamber 327 above piston 126. Slot 340 intermittently connects conduits 326 and 328 as it rotates and is descriptively referred to as a "chopper" valve. It serves to restrict flow between conduits 326 and 328. The area of slot 340 is substantially greater than that of an equivalent fixed restriction between the two conduits. A number of parallel slots may be substituted for the single slot 340, if desired.

When the barometric servo valve 124 is elevated above its neutral position, fluid is permitted to flow from annular chamber 308 through outlet 140 to reservoir 74, thereby reducing the pressure $(p_3)$ in conduits 326 and 328. Simultaneously, fluid is permitted to flow from conduit 106 through port 332, chamber 310, and conduit 322 to chamber 324, thereby increasing the pressure $(p_5)$ in chamber 324.

When valve 124 is depressed below its neutral position, fluid is permitted to flow from conduit 106 through port 332, and chamber 308, to conduits 326 and 328, thereby increasing the pressure ($p_3$) in conduits 326 and 328. Simultaneously, fluid flows from chamber 310 through outlet 138 to reservoir 74, thereby reducing the value of pressure ($p_5$) in conduit 322 and chamber 324.

The position of rod 268 and hence the position of pin 336 is determined by the pressure differential ($p_M-p_0$) acting on bellows 134 and 136 and by spring 274, there being a different predetermined position of the pin for each value of the differential, at any given fixed position of spring support 270. In steady state operation, when the barometric servo valve is in its neutral position, as shown, the positions of the power piston 126 and of rod 282 are predetermined by the position of fulcrum pin 336 and the pressure differential ($p_5-p_4$) acting on piston 126. This differential has a substantially constant value when the barometric control system is in equilibrium, and equals zero when the apparatus is constructed so that no force is required to maintain bearing 208 in any fixed position corresponding to a fixed position of pin 336.

The barometric control system varies the position of power piston 126 and rod 282 to maintain servo valve 124 in its neutral position as the position of fulcrum pin 336 changes in response to changes in the value of the differential ($p_M-p_0$). The pressure $p_M$ is a function of the compressor discharge pressure $p_D$ and is equal thereto, except when the overspeed governor 142 opens port 248 which reduces the pressure $p_M$ to a value below that of $p_D$, but even then $p_M$ is still a function of $p_D$. The pressure $p_0$ is zero, so the pressure differential $p_D-p_0$ is the absolute compressor discharge pressure, and therefore the pressure differential $p_M-p_0$ is a function of the absolute compressor discharge pressure which varies directly with the barometric pressure outside the engine. The barometric control system therefore positions bearing 208 as a function of the barometric pressure. The power for positioning bearing 208 is supplied by the hydraulic system. The downward load on main power piston 110 due to spring 204 is therefore modified in accordance with the barometric pressure.

Chamber 327 is connected to check valve chamber 330 by a conduit 342 for flow from chamber 327, past a ball check valve 344 into chamber 330, when the pressure ($p_4$) exceeds pressure ($p_3$) in chamber 330 by a small amount predetermined by a spring 346 which loads the valve. The check valve prevents reverse flow from chamber 330 to conduit 342 at all times.

Considering the barometric control system independently of the manual control, speed control and other component control systems, when a condition of equilibrium is disturbed by an increase in compressor discharge pressure ($p_D$) and hence when the differential ($p_D-p_0$) or ($p_M-p_0$) increases, bar 268 and fulcrum pin 336 are lowered to a new position. The right end of barometric floating lever 128 is not affected until pressure changes produced by the valve cause movement of piston 126. Downward movement of pin 336 causes downward movement of the servo valve 124 and consequent increase of pressure ($p_3$) in chamber 308 and conduits 325 and 326 as previously explained, and also decrease of pressure ($p_5$) in chamber 310, conduit 322, and chamber 324 below power piston 126. Increase of pressure ($p_3$) in conduit 326 produces a flow through chopper valve 340, resulting in a corresponding increase in pressure ($p_4$) in chamber 327 above the power piston. The rate of change of pressure ($p_4$) is a function of chopper valve 340. As the differential increases, the barometric power piston 126 moves downward, thereby turning lever 128 clockwise on fulcrum pin 336 and moving servo valve 124 upwards toward its neutral position. The downward movement of piston 126 and rod 282 continues until the neutral position of valve 124 is restored and rod 282 is in a new position corresponding to the neutral position of the valve and the new lower fixed position of pin 336. When equilibrium occurs, pressures ($p_4$) and ($p_5$) are again substantially constant.

In the above train of events, the particular value acquired by the differential ($p_4-p_5$) in restoring valve 124 to its neutral position is not important, since all that is required is that the position of rod 282 corresponds to the neutral position of the valve. If movement of rod 282 is opposed by frictional or other forces, the control operates to vary the differential ($p_4-p_5$) sufficiently to compensate such forces. During the process, check valve 344 remains seated, since the pressure ($p_4$) cannot increase above the pressure ($p_3$).

When the pressure differential ($p_D-p_0$) or ($p_M-p_0$) decreases, with the barometric control system in an initial state of equilibrium, bar 268 and pin 336 rise causing clockwise movement of lever 128 about its pivotal connection with rod 282 and raising the servo valve 124 about its neutral position. As previously explained, pressures ($p_3$) or ($p_4$) decrease and pressure ($p_5$) increases, thereby causing piston 126, rod 282, and the right-hand end of lever 128 to move upwardly so that the servo valve moves downward toward its neutral position. During this process, decrease in the value of pressure ($p_3$) allows check valve 344 to move leftward, thereby allowing fluid to flow from chamber 327 so that pressure ($p_4$) decreases more rapidly than would be permitted by reversed flow from conduit 338 through chopper valve 340. Hence rod 282 moves upwardly (in a fuel flow decreasing direction) more rapidly than it moves downwardly (in a fuel flow increasing direction). This action provides a stabilizing effect on the speed governing system. Equilibrium of the barometric control system is restored with valve 124 in its neutral postion, with fulcrum pin 336 in a new higher fixed position, with rod 282 in a corresponding new higher position in which the upward and downward forces on the rod are in equilibrium, and with check valve 344 again seated. As is apparent from the drawing, when movement of fulcrum pin 336 displaces the barometric servo valve 124 in either direction from its neutral position, the barometric power piston 126 is required to move approximately twice as far in the same direction to restore the valve to its neutral position.

*Thermal control system*

The thermal control system is essentially a means for overriding the manual control system to reduce the fuel flow and engine speed when a predetermined limiting value of temperature is exceeded.

Thermal control 76, as shown, includes a body 348 on which is fixed a thin walled tube 350 having its right end closed. Body 348 is provided with a pair of chambers 352 and 354 separated by an apertured wall 356 and connected to conduits 162 and 160, respectively. A rod 358 is fixed to the closed right end of tube 350 and is slidably operable in the apertured end of body 348 on which tube 350 is assembled. The left end of rod 358 is contoured as a valve 360 which is normally seated in wall 356 to prevent flow from chamber 354 to chamber 352. Tube 350 and rod 358 are made from materials having substantially different coefficients of thermal expansion, so that when the tube and rod are heated, the tube expands faster than the rod, the thermal control generally being made so that the valve remains closed until the predetermined limiting temperature is exceeded. The control is installed with tube 350 exposed to the engine temperature, as in the tail pipe 30 of the engine of Figure 1. Then, when the tail pipe temperature exceeds the limiting value, the valve opens to permit flow from conduit 160 through chamber 354, past valve 360, into chamber 352, and through conduit 162 to reservoir 74. The pressure $(p_c)$ in conduit 160 is decreased as valve 360 opens.

The thermal piston 155 functions as a chopper valve similar to chopper valve 340 in the barometric control system. It consists of a generally cylindrical center portion operated in an apertured portion of wall 164 by means of a shaft 362 which is rotated concurrently with shaft 171. A push rod 364 is attached to the upper end of the piston and extends through wall 164 for engagement, under conditions to be specified, with a finger 366 fixed to push rod 114. A chamber 368 is provided above piston 155, and the latter is biased upwardly by a spring 370. Piston 155 is provided with a slot 372 so that when the piston is rotated, chamber 368 is intermittently connected through slot 372 to the upper end of conduit 157 leading to main fluid conduit 106 and to one end of conduit 374, the other end of which is normally closed by push rod 238.

When valve 360 in thermal control 70 is closed, the pressure in chamber 368 is maintained at pressure $(p_1)$, as in conduit 157, and piston 155 is held down so that push rod 364 does not contact finger 366. When the limiting engine temperature is exceeded, however, valve 360 opens and fluid is drained from chamber 368, the pressure therein thereby being reduced owing to a drop across slot 372, so spring 370 forces valve 155 up and causes push rod 364 to engage finger 366, causing the latter to rise and move the main floating lever 112 in a counterclockwise or fuel flow decreasing direction. A decrease of the value of pressure $(p_c)$ results and the fuel flow and engine speed are decreased below the values corresponding to the manual control setting. The flow remains at its decreased rate until the engine temperature is reduced to or slightly below the limiting value, whereupon thermal control valve 360 closes, valve 155 moves down, and normal operation is resumed.

The thermal control used in the fuel control apparatus need not necessarily be the particular type shown since any temperature responsive device functionally equivalent to control 70 may be employed if desired.

Provision is here made for operating the thermal control system, as follows:

Fluid may be supplied at pressure $(p_1)$ to conduit 374 from a conduit 376 which is connected to conduit 104. This supply is controlled by an annular groove 378 in a portion of rod 238 which is guided by a portion 379 of casing 72. The ends of conduits 376 and 374 enter portion 379 of casing 72 and are separated from each other by rod 238 when the position of cam 150 corresponds to any position of the engine control lever in a preselected range of movement of lever 64, which may, for example, be the 0°–90° range. When the control lever is further advanced, however, the lift of cam 150 increases so that conduit 374 is opened through groove 378 to conduit 376. At normal engine temperatures, no flow occurs past groove 378 since the same pressure $(p_1)$ exists on both sides of it. However, when the limiting engine temperature is exceeded and thermal control valve 360 opens, chopper valve 155 is supplied with fluid at pressure $(p_1)$ by both conduits 157 and 374, and the pressure in chamber 368 corresponding to any opening past valve 360 is greater than in the previously explained case in which conduit 374 was closed by rod 238.

Thus, while the action of thermal control 70 is always the same in respect to temperature and rate of valve opening, the response of thermal piston 155 is less rapid when the control lever is in its last ten degree or other desired range of travel, in which the engine speed setting remains constant and the fuel flow is manually variable to vary the engine power.

The two kinds of thermal override control are sometimes referred to as applying to normal and emergency operation, respectively. Thus, when the lever is advanced in the 90°–100° range to increase the fuel flow to obtain increased or emergency power, thermal override is desired to occur less rapidly and at a higher value of temperature than in normal operation in the 0°–90° range of control lever travel.

*Coordination of the manual, speed, and barometric control systems*

The manual, speed, and barometric control systems cooperate to regulate the fuel flow and engine speed as a function of manual control, speed, and the absolute compressor discharge pressure, as represented by the pressure differential $(p_D - p_0)$. The operation of the manual control system was previously explained on the assumption of a fixed position of circular bearing 208 in lever mechanism 132. The barometric control system, and the speed control system (by modifying the pressure $p_D$), vary the position of bearing 208, thereby varying the downward force on main power piston 110 and hence varying the value of the variable control oil pressure $(p_c)$ in chamber 190 and conduits 122 and 56.

As bearing 208 moves leftward, corresponding to downward movement of the barometric power piston 126 produced by an increase of the pressure differential $(p_D - p_0)$ or $(p_M - p_0)$, the force transmitted by the bearing from spring 204 and lever 198 to lever 194 and rod 192 is increased so that the value of pressure $(p_c)$ corresponding to the position of main control shaft 60 increases. Conversely, as bearing 208 moves rightward, corresponding to decrease of the differential $(p_D - p_0)$ or $(p_M - p_0)$, the pressure $(p_c)$ decreases.

It is thus seen that the value of the variable control oil pressure $(p_c)$ corresponding to any given position of the manual control lever 64 (Fig. 1), depends upon the barometric and speed control systems, the pressure $(p_c)$ increasing as the differential $(p_D - p_0)$ or $(p_M - p_0)$ increases, as when the engine speed increases, the speed of flight increases, or as the altitude of flight decreases.

Since the compressor discharge pressure $(p_D)$ increases as the engine speed increases (until speed governor 142 cuts in to modify $p_D$), it follows that the barometric control system controls the rate of acceleration below maximum permissible speed when the engine control lever is advanced. On movement of the lever, within the first 90° range of operation, from one position to another corresponding to a higher rate of speed, the initial value of the pressure ($p_c$) corresponds to the initial value of the differential ($p_D - p_0$) and the initial lever position. The increase of the variable oil control pressure ($p_c$), due to movement of the manual control is relatively rapid, but the corresponding increase due to increase of the differential ($p_D - p_0$) occurs only as the engine speed increases and as the barometric control system responds to such speed increase. The barometric control system thus serves to control acceleration and deceleration of the engine.

As the entering air density increases directly with speed of flight and inversely with altitude of flight, the compressor discharge pressure ($p_D$) and the pressure differential ($p_D - p_0$) correspondingly increase, and bearing 208 moves leftward to increase the pressure ($p_c$) and the fuel flow as above explained. Conversely, as the flight speed decreases and the altitude increases, the differential ($p_D - p_0$) decreases and bearing 208 moves rightward to decrease the pressure ($p_c$). The barometric control is sometimes descriptively referred to as the altitude control, and cam 130 is customarily contoured with closer regard to altitude compensation than to acceleration control, particularly since the latter is accomplished to some extent by chopper valve 340.

The contour of the barometric cam 130 is made to provide a desired position of bearing 208 for every value of the compressor pressure differential. In steady state operation, in which the temperature control system is ineffective and the control apparatus is in equilibrium, the fuel flow is dependent upon: (1) the manual and barometric control systems; and (2) the speed control system which overrides these combined systems to reduce the fuel flow at excessive engine speeds, as previously explained.

In the invention disclosed in my parent application cited, the cutting in of the speed governor, due to overspeeding of the engine, causes the overspeed piston to rise and reset the main power servo valve and piston which in turn reduces the variable oil control pressure and fuel flow to the engine, with resultant reduction of engine speed. In the invention herein disclosed the cutting in of the over-speed governor opens a valve which causes a change in the compressor discharge pressure ($p_D$) in the barometric control system which in turn varies the variable oil control pressure $p_c$, with resultant change in fuel flow to the engine and engine speed. The "droop" of the speed governor is the permanent error in engine speed required to make a full change in available fuel flow, and is generally expressed as a percentage of speed (R. P. M.) at a given speed range of the engine, between initiation of governor cut-in and full cut-in. It is usually required that the droop of the speed governor shall not exceed a specified percentage of engine speed (R. P. M.) at a specified speed range, a specified compressor discharge pressure ($p_D$), and 90 degree manual control lever position (full-open throttle).

As a result of experience gained in the operation of a fuel and speed control apparatus constructed in accordance with the invention disclosed in my parent application cited, I have found that the "droop" of the speed governor can be radically reduced, and the governor made substantially isochronous, by causing the governor, on cut-in, to vary the pressure in the compressor discharge bellows, which will act to vary the control oil pressure in the same manner as a variation in the actual compressor discharge pressure. This novel concept, as embodied in the construction disclosed in this application, not only radically reduces the "droop" of the speed governor, but also greatly simplifies the control apparatus without loss of performance.

Figure 4:
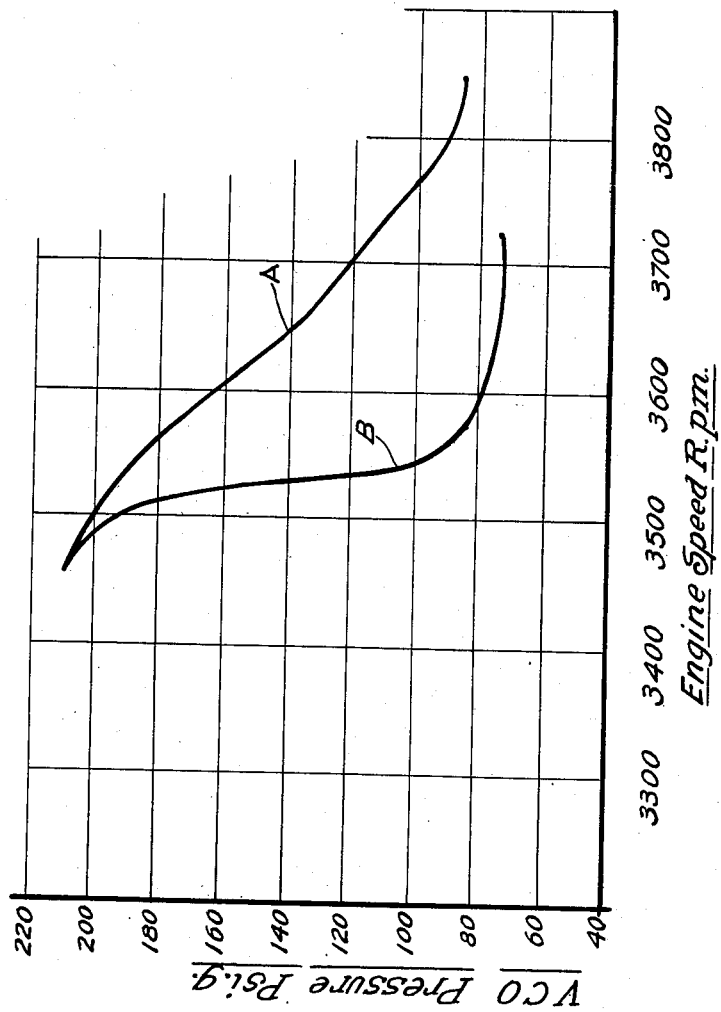
Figure 4 shows, diagrammatically, certain speed governor characteristics of my improved control apparatus.

Fig. 4 shows a comparison between the governor "droop" curves obtained in actual performance tests with a fuel and speed control apparatus constructed in accordance with the invention disclosed in my parent application cited, and with a fuel and speed control apparatus constructed in accordance with the embodiment of my invention disclosed in Fig. 2 of this application. In these comparative tests, the performance runs were made under identical conditions, with both governors set to cut in at an engine speed of 3,500 R. P. M., a compressor discharge pressure of 95 pounds per square inch, gauge, and an initial variable control oil pressure of approximately 205 pounds per square inch, gauge. Curve A shows the results obtained with the control apparatus according to the invention disclosed in my parent application cited, and curve B shows the results obtained with the control apparatus according to the embodiment of my invention disclosed in Fig. 2 of this application. From these curves it will be noted that the latter control apparatus has a much more rapid drop than the former, as indicated by the relative slopes of curves A and B. It will also be noted that at any particular point in the speed range tested, the droop of the latter control apparatus is only a small fraction of the corresponding droop of the former, as indicated by the relative abscissas between the vertical line at 3,500 R. P. M. and curves A and B. Thus, at 3,800 R. P. M. (VCO pressure of 90 pounds per square inch), the former showed a droop of 300 R. P. M., while the latter showed a corresponding droop of 40 R. P. M., or only 13 percent of the former.

The governor according to Fig. 2 of this application reduces the VCO pressure, after cut-in, as a function of the pressure in the compressor discharge bellows 134, and this pressure depends on the governor lift, i. e., on the speed of the governor shaft 58. Theoretically, the pressure $p_M$ in the bellows 134 does not reach its minimum value, after cut-in, until the governor sleeve 156 has lifted a sufficient distance (e. g. 0.125″) to fully uncover the port 248. In practice, however, the bleed hole in restriction 53 can be made so small that any further reduction in VCO after the speed of the engine has exceeded the cut-in speed by say 175 R. P. M. is too small to be detected. (See curve B of Fig. 4.)

In the control apparatus used for the tests indicated in curve B of Fig. 4, the bleed hole in restriction 53 was size #80 (0.000143 square inch). With a lift of governor sleeve 156 of 0.01 inch, corresponding to an engine speed increase from say 3,500 R. P. M. to about 3,850 R. P. M., the area of the open portion of port 248 was 0.000916 square inch, or about seven times the area of the bleed hole in restriction 53. It is thus apparent that a relatively small increase in engine speed about the governor setting will very rapidly reduce the pressure ($p_M$)

in bellows 134 and the VCO pressure, with corresponding reduction in fuel flow and engine speed.

Since a minimum governor droop is desirable, the size of the bleed hole in restriction 53 should be made as small as possible. It was found that a #80 size hole was as small as it was practicable to use and therefore the result shown in curve B of Fig. 4 approaches about as close to isochronism as is possible with the type of control apparatus disclosed in Fig. 2 of this application.

Figure 3:
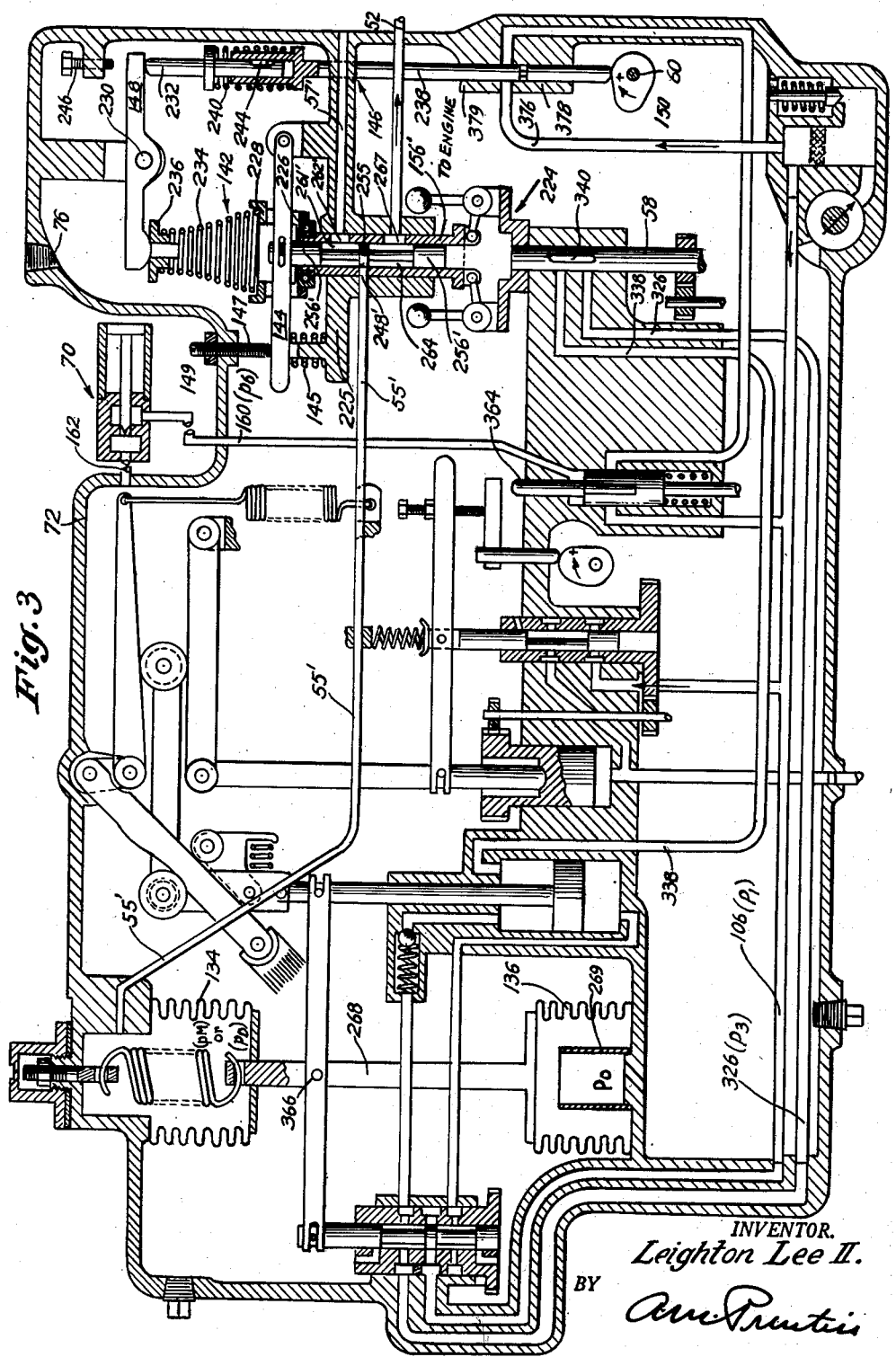
Figure 3 shows a modification of certain elements of the construction shown in Figure 2, according to another embodiment of my invention.

*Figure 3*

In order to still further reduce the droop of the speed governor and to produce a substantially completely isochronous governor, I have devised the modification of my invention illustrated in Fig. 3 of the drawings.

In this modification, the only changes made in the construction and arrangement of elements shown in Fig. 2 are as follows:

(1) Instead of connecting the interior of bellows 134 to the compressor discharge conduit 52, through a restriction 53, and with a branch conduit 55 to bleed off compressed air whenever port 248 in speed control mechanism 142 is uncovered by valve 256; conduit 52 is connected directly to annular chamber 264 in valve sleeve 156' which in turn communicates through port 248' and conduit 55' with the interior of bellows 134, whenever port 248' is uncovered by the downward movement of valve sleeve 156', relative to the middle land 255 of valve 256'.

(2) Whenever port 248' is uncovered by the upward movement of valve sleeve 156', relative to middle land 255 of valve 256', compressed air is discharged from the interior of bellows 134 through conduit 55', annular chamber 261', port 262 and conduit 57' to the outside atmosphere.

From the foregoing, it is apparent that whenever valve sleeve 156' is pushed down by the force of spring 234 so that port 248' is uncovered, compressed air will be fed to the interior of bellows 134 from conduit 52 until the pressure in bellows 134 is equal to the compressor discharge pressure ($p_D$) in conduit 52. When valve sleeve 156' is raised by speed governor 224 until land 255 of valve 256' covers port 248', compressed air at pressure ($p_D$) will be trapped in bellows 134 and will remain substantially at pressure ($p_D$), (except for such slight variation in pressure as may be produced by a movement of rod 268 and pivot 366 which will slightly expand or contract bellows 134), until port 248' is again uncovered by land 255 of valve 256'. It is also apparent that whenever valve sleeve 156' is pushed up by the thrust of speed governor 224 so that port 248' is uncovered by land 255 of valve 256', compressed air will escape from bellows 134 and rapidly reduce the pressure therein to a value less than pressure ($p_D$).

It is further apparent from Fig. 3 that a slight overspeeding of the engine above the R. P. M. for which governor spring 234 is set will lift valve sleeve 156', opening port 248', and quickly reduce the pressure in bellows 134. This will correspondingly reduce the variable control oil pressure ($p_c$) to the full cut-in value. Theoretically, this reduction in variable control oil pressure requires only an infinitesimal change in engine speed, which means that the speed governor is completely isochronous. Actually, however, it is necessary to provide a slight overlap of land 255 over port 248', in the order of 0.005 inch, to insure a tight seal in the air circuit of bellows 134 when governor 224 is cut in, and this involves a droop of a few R. P. M. in actual manufacture. Nevertheless, this droop is so small as to render the speed governor substantially isochronous for all practical purposes.

As the operation of the fuel and speed control apparatus shown in Fig. 3 is identical with that already described for the construction shown in Fig. 2, except as just indicated above, and the speed governor of Figure 3 is an all-speed governor, whereas that of Figure 2 is an overspeed governor only, no further description of the operation of the modification of Figure 3 is necessary.

While I have shown and described the preferred embodiments of my invention, it is to be understood that I do not limit myself to the precise constructional details disclosed by way of illustration, as these may be changed and modified by those skilled in the art without departing from the spirit of my invention or exceeding the scope of the appended claims.

I claim as my invention:

1. Fuel and speed control apparatus for an internal combustion engine having a pump separate from said apparatus, for delivering fuel to said engine, and an air compressor, said pump having means for varying said fuel delivery in accordance with a variable control pressure of a liquid supplied to said pump by said apparatus from a source separate from said fuel supply; comprising: means for modifying a portion of the discharge pressure of said compressor in accordance with the speed of said engine, and means for varying said control pressure in accordance with said modified discharge pressure, so that the fuel delivery of said pump is a predetermined function of compressor discharge pressure and engine speed.

2. Fuel and speed control apparatus for an internal combustion engine having a pump, separate from said apparatus, for delivering fuel to said engine, and an air compressor, said pump having means for varying said fuel delivery in accordance with a variable control pressure of a liquid supplied to said pump by said apparatus from a source separate from said fuel supply; comprising: means for modifying a portion of the discharge pressure of said compressor in accordance with a predetermined, maximum speed of said engine, and means for varying said control pressure in accordance with said modified discharge pressure, so that the fuel delivery of said pump is a predetermined function of compressor discharge pressure and said maximum speed.

3. Fuel and speed control apparatus according to claim 1, including manual control means, operatively associated with said discharge pressure modifying means, for selectively varying the point in the speed range of said engine at which said discharge pressure modifying means becomes effective.

4. Fuel and speed control apparatus according to claim 3, wherein said manual control means includes means for selectively varying said control pressure independently of compressor discharge pressure.

5. Fuel and speed control apparatus according to claim 2, including manual control means, operatively associated with said discharge pressure modifying means, for selectively setting the point in the speed range of said engine at which said discharge pressure modifying means becomes effective.

6. Fuel and speed control apparatus according to claim 5, including means for adjusting the setting of said point.

7. Fuel and speed control apparatus according to claim 5, including adjustable stop means for limiting the effective operating range of said manual control means.

8. Fuel and speed control apparatus according to claim 1, wherein said compressor discharge pressure modifying means includes a substantially completely isochronous speed governor.

9. Fuel and speed control apparatus according to claim 1, wherein said compressor discharge pressure modifying means includes a speed governor and means for adjusting the droop of said governor so as to make said governor as nearly isochronous as desired.

10. Fuel and speed control apparatus according to claim 1, including means, operatively associated with said discharge pressure modifying means, for varying said modified compressor discharge pressure in accordance with the barometric pressure of the atmosphere outside said engine, so that the fuel delivery of said pump is a predetermined function of said compressor discharge pressure, said barometric pressure and engine speed.

11. Fuel and speed control apparatus for an internal combustion engine having a pump for delivering fuel thereto, and an air compressor, said pump having means for varying said fuel delivery in accordance with a variable control liquid pressure supplied to said pump by said apparatus; comprising: means for modifying a portion of the discharge pressure of said compressor in accordance with a selected maximum speed of said engine, means operatively associated with said discharge pressure modifying means, for varying said modified discharge pressure in accordance with the barometric pressure of the atmosphere outside said engine, and means for varying said control pressure in accordance with said modified discharge pressure, so that the fuel delivery of said pump is a predetermined function of compressor discharge pressure, said barometric pressure and said maximum engine speed.

12. Fuel and speed control apparatus according to claim 11, including manual control means operatively associated with said discharge pressure modifying means, for selectively varying the point in the speed range of said engine at which said discharge pressure modifying means becomes effective.

13. Fuel and speed control apparatus according to claim 11, including means for modifying said control pressure in accordance with engine temperature and operatively associated manual control means for selectively setting the point in the temperature range of said engine at which said control pressure modifying means becomes effective.

14. Fuel and speed control apparatus according to claim 13, including means for adjusting the setting of said point.

15. Fuel and speed control apparatus according to claim 12, including adjustable stop means for limiting the effective operating range of said manual control means.

16. Fuel and speed control apparatus according to claim 11, wherein said compressor discharge pressure modifying means includes a speed governor and means for adjusting the droop of said governor so as to make said governor as nearly isochronous as desired.

17. Fuel and speed control apparatus according to claim 1, including means operatively associated with said discharge pressure modifying means, for modifying a portion of said compressor discharge pressure in accordance with the temperature of the exhaust gases in said engine, so that the fuel delivery of said pump is a predetermined function of compressor discharge pressure, said temperature and engine speed.

18. Fuel and speed control apparatus according to claim 11, including means, operatively associated with said discharge pressure modifying means, for modifying a portion of said compressor discharge pressure in accordance with the temperature of the exhaust gases in said engine, so that the fuel delivery of said pump is a predetermined function of compressor discharge pressure, said barometric pressure, said temperature and engine speed.

19. Fuel control apparatus for an internal combustion engine having associated therewith a fuel pump and an air compressor, said pump having means for varying its delivery to said engine; comprising: a source of liquid under superatmospheric pressure, conduit means for the flow of liquid from said source, control means in said conduit means, responsive to the discharge pressure of said compressor modified according to engine speed, for controlling a pressure in a portion of said conduit means, said delivery varying means being responsive to said controlled pressure, a device responsive to the engine speed, governor means actuated by said device for modifying a portion of said compressor discharge pressure according to engine speed, to operate said control means in a sense to reduce said fuel flow when a predetermined value of said speed is exceeded, means for varying said predetermined value of speed, and adjustable stop means for limiting the movement of said varying means to determine the maximum value of said speed.

20. Control apparatus as set forth in claim 19, including a spring for opposing motion of said speed responsive device in response to an increase in speed, a cam, means for operating said cam, a follower operated by said cam, means for varying the deflection of said spring, a motion-transmitting connection between said follower and said deflection varying means, a stop for limiting motion of said deflection varying means in a speed increasing sense to determine the maximum value of said speed, and means in said connection for permitting relative motion between said follower and said deflection varying means when said cam operates said follower so as to move said deflection varying means against said stop, whereby movement of said cam operating means is not affected by said stop.

21. Control apparatus as set forth in claim 19, including manual means for operating said control means, means responsive to a temperature in said engine and effective when a predetermined value of said temperature is exceeded to override said control means in a sense to reduce said fuel flow, and means operated by said manual means for varying said predetermined value.

22. Control apparatus for an internal combustion engine having an air compressor; comprising: means, responsive to the discharge pressure of said compressor modified according to engine speed, or controlling the supply of fuel to said engine; engine speed responsive means for modifying a portion of said compressor discharge pressure, to operate said fuel controlling means so as to maintain said engine speed at a substantially constant value, means responsive to a temperature in said engine for operating said fuel controlling means to reduce the fuel supply when said temperature exceeds a predetermined value, manually operable adjusting means for controlling said speed responsive means to vary said substantially constant speed value, means associated with said adjusting means and operable after said substantially constant speed is set at a predetermined value to increase the temperature value at which said temperature responsive means become effective to reduce said fuel supply.

23. Control apparatus for an internal combustion engine, comprising: means for controlling the supply of fuel to said engine in response to a variable control liquid pressure, and means for controlling said variable pressure including a barometric control system, an engine speed responsive control system for modifying the action of said barometric control system, and a main control system, each of said systems comprising a valve guide, a valve translatable and rotatable in said guide, a cylinder, a piston translatable and rotatable in said cylinder, and means for subjecting at least one end of said piston to a pressure controlled by its associated valve, a base casting, a mounting casting for connecting said base casting to said engine, a shaft driven by said engine and extending into said mounting casting, said base casting having parallel bores therein for receiving said cylinders and at least one of said valve guides, and gearing means driven by said shaft for continuously rotating all said valves and at least one of said pistons.

24. Control apparatus as set forth in claim 23, including pressure responsive means in said barometric control system for operating the valve therein, speed responsive means in said speed responsive control system for operating the valve therein, manually operable means in said main control system for operating the valve therein, and a bracket mounted on the face of said base casting opposite said mounting casting and supporting said pressure responsive means, said speed responsive means and said manually operable means.

25. Control apparatus for an internal combustion engine having an air compressor and means separate from said apparatus for supplying fuel to said engine, comprising: means for regulating the flow of fuel to said engine, motor means for positioning said fuel flow regulating means, means responsive to engine speed for modifying a portion of the discharge pressure of said compressor, means responsive to said modified discharge pressure for controlling said motor means, and a stop for selectively limiting the travel of said motor means in a fuel flow decreasing direction.

26. Control apparatus as described in claim 25, including means for adjusting the position of said stop.

27. Fuel and speed control apparatus for a turbojet engine having an incorporated air compressor and a fuel pump separate from said apparatus and associated with said engine for delivering fuel to said engine, said pump having means for varying said fuel delivery in accordance with a variable control pressure of a liquid supplied to said pump by said apparatus from a source separate from said fuel supply; comprising: means responsive to engine speed for modifying a portion of the discharge pressure of said compressor, and means for varying said control pressure in accordance with said modified discharge pressure, so that the fuel delivery of said pump is a predetermined function of compressor discharge pressure and engine speed.

28. Fuel and speed control apparatus for a turbojet engine having an incorporated air compressor and a fuel pump separate from said apparatus and associated with said engine for delivering fuel to said engine, said pump having means for varying said fuel delivery in accordance with a variable control pressure of a liquid supplied to said pump by said apparatus from a source separate from said fuel supply; comprising: means responsive to engine speed for modifying a portion of the discharge pressure of said compressor in accordance with a selected maximum speed if said engine, and means for varying said control pressure in accordance with said modified discharge pressure, so that the fuel delivery of said pump is a predetermined function of compressor discharge pressure and said speed.

29. Fuel and speed control apparatus for a turbojet engine having an incorporated air compressor and means for supplying fuel to said engine, comprising: means for controlling the speed of said engine by regulating the fuel supply thereto, including a droop-type, centrifugal speed governor, driven by said engine, for regulating the rate of said fuel supply, means, operatively associated with said speed control means, for modifying a portion of the discharge pressure of said compressor according to engine speed, and means, responsive to said modified discharge pressure and operatively associated with said governor for anticipating and accelerating the action of said governor, thereby substantially eliminating its droop, and hence the time lag in the response of said control apparatus to changes in engine speed.

LEIGHTON LEE II.

References Cited in the file of this patent

UNITED STATES PATENTS

| Number | Name | Date |
|---|---|---|
| 2,219,994 | Jung | Oct. 29, 1940 |
| 2,341,257 | Wünsch | Feb. 8, 1944 |
| 2,391,291 | Bollo et al. | Dec. 18, 1945 |
| 2,400,415 | Hersey | May 14, 1946 |
| 2,403,371 | Ifield | July 2, 1946 |
| 2,410,474 | Zeigler | Nov. 5, 1946 |
| 2,424,035 | Ifield | July 15, 1947 |
| 2,450,535 | Watson et al. | Oct. 5, 1948 |
| 2,452,088 | Whitehead | Oct. 26, 1948 |
| 2,528,252 | Starkey | Oct. 31, 1950 |
| 2,560,118 | Malone et al. | July 10, 1951 |
| 2,573,724 | Neal | Nov. 6, 1951 |
| 2,576,352 | Neal | Nov. 27, 1951 |